Figure 1:
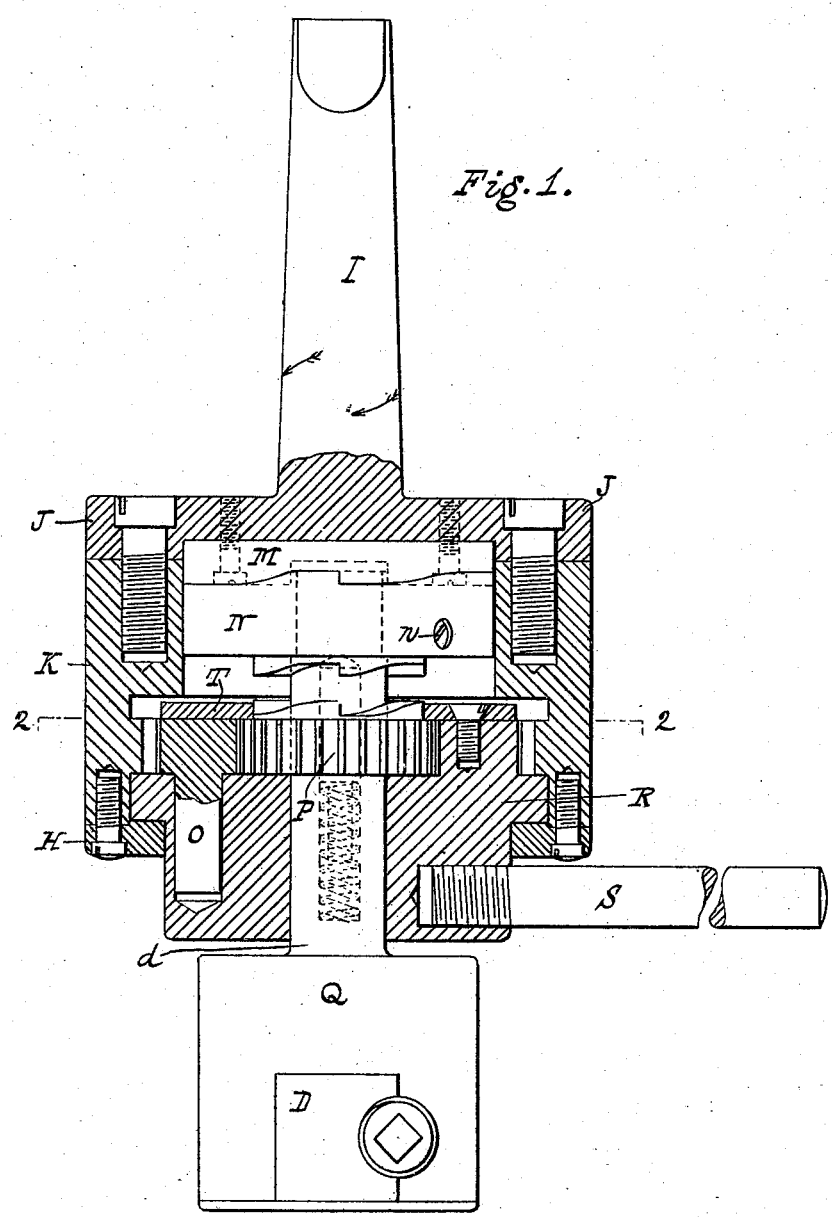

No. 873,441. PATENTED DEC. 10, 1907.
W. A. LEONARD.
REVERSING TAP HOLDER.
APPLICATION FILED FEB. 6, 1907.

3 SHEETS—SHEET 1.

WITNESSES
INVENTOR
Wilbur A. Leonard
BY
Howson and Howson
ATTORNEYS

No. 873,441.  
PATENTED DEC. 10, 1907.  
W. A. LEONARD.  
REVERSING TAP HOLDER.  
APPLICATION FILED FEB. 6, 1907.
3 SHEETS—SHEET 2.
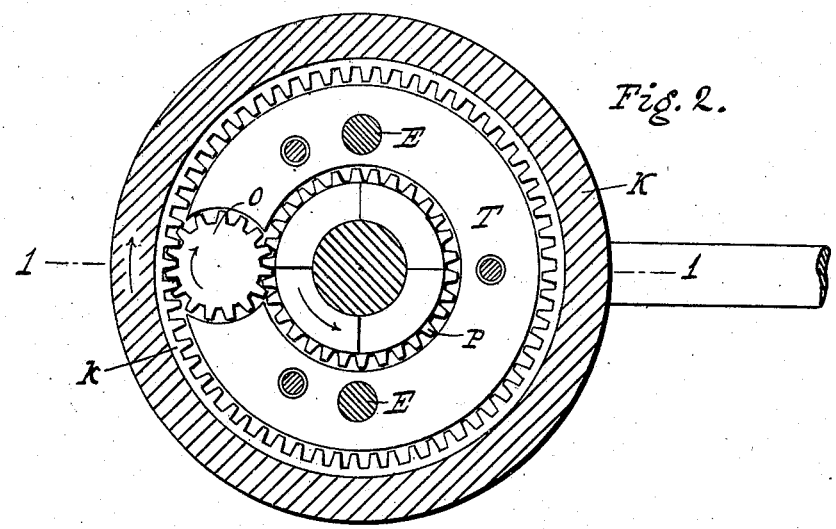
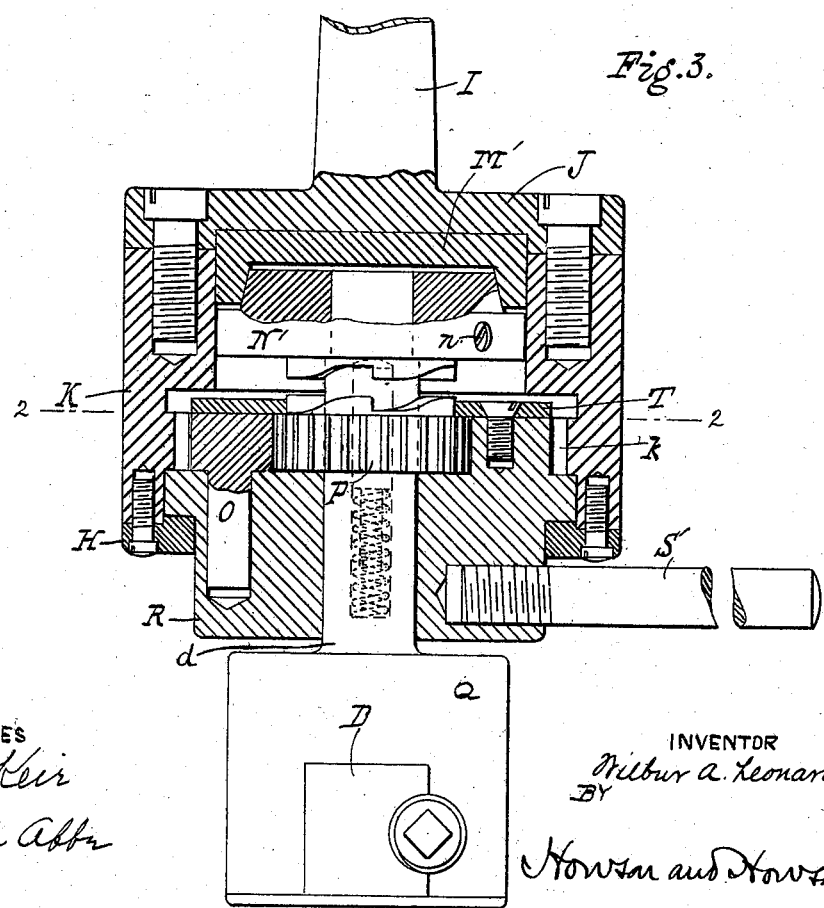

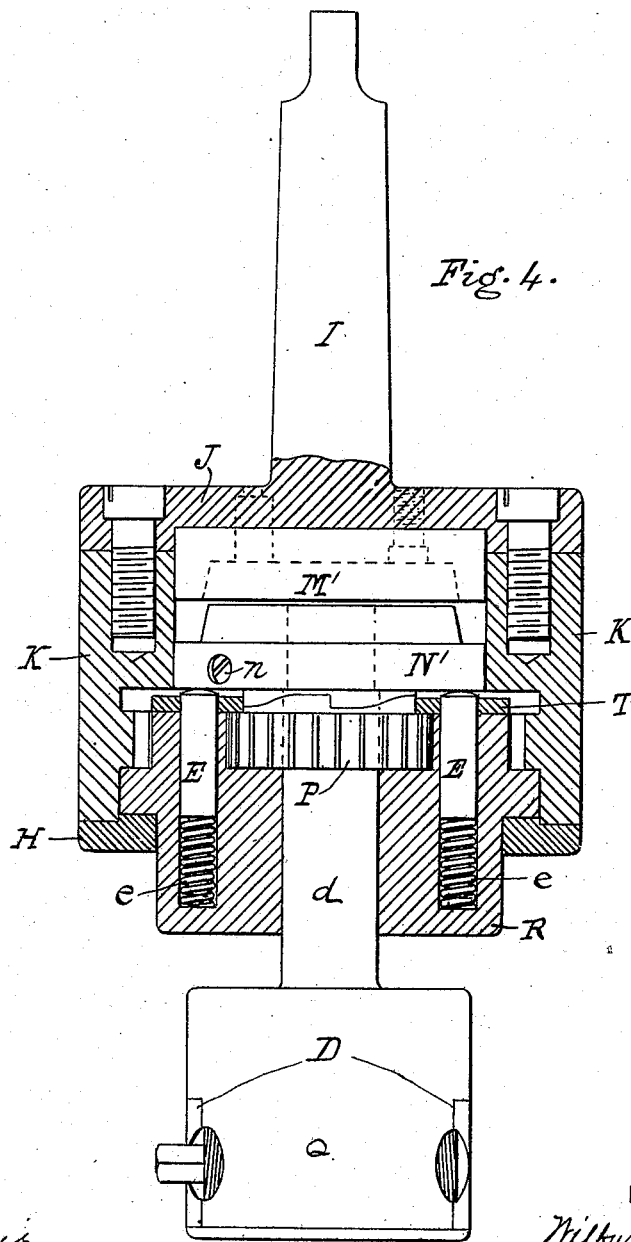

UNITED STATES PATENT OFFICE.

WILBUR A. LEONARD, OF NEW HAVEN, CONNECTICUT, ASSIGNOR TO THE GEOMETRIC TOOL COMPANY, OF NEW HAVEN, CONNECTICUT, A CORPORATION OF CONNECTICUT.

REVERSING TAP-HOLDER.

No. 873,441.        Specification of Letters Patent.        Patented Dec. 10, 1907.

Application filed February 6, 1907. Serial No. 355,992.

*To all whom it may concern:*

Be it known that I, WILBUR A. LEONARD, a citizen of the United States of America, residing at New Haven, in the county of New Haven, in the State of Connecticut, have invented a certain new and useful Improved Reversing Tap-Holder, of which the following is a specification.

The object of my invention is to provide a simple and efficient tapping head or tap holder, which will readily reverse to back the tap out of the work quickly.

In the accompanying drawings Figure 1 is a section of a tapping head or holder on the line 1—1, Fig. 2; Fig. 2 is a section on the line 2—2, Fig. 3; Fig. 3 is a sectional view of a modification; and Fig. 4 is a section in a plane at right angles to the section, Fig. 3, and showing the clutch thrown to the reversing or backing out position.

The casing comprises a shank I, with flange J, bolted to a shell K, and within this shell is a body part R, retained by means of a ring H, bolted to the lower face of the shell. To the flange J is secured, by means of screws or otherwise, one face of a clutch member. This may be a positive clutch as shown at M, Fig. 1, to engage a correspondingly toothed face on the movable part N of the clutch, or this part of the clutch may be a coned friction clutch face $M^1$, as shown in Figs. 3 and 4, to engage with a coned face on the movable member $N^1$. The movable or driven clutch member N or $N^1$ is preferably guided within the shell K and has pinned to it, as by a screw $n$, the sprindle $d$ of the clutch D carrying the tap. The body part R forms no part of the clutch. Normally the clutch member N ($N^1$) is held in engagement with the clutch member M ($M^1$) carried by the shell by spring means, such as those illustrated in Fig. 4, and consisting of two springs $e$, $e$, acting on push pins E, E, carried in the body part R, and bearing against the lower face of the clutch member N ($N^1$).

Fitting freely around the spindle $d$ of the chuck and seated in a recess in the body R, is a gear P having clutch teeth with which may engage clutch teeth on the member N ($N^1$). Into this wheel P gears a pinion O having an axis turning in a bearing in the body R and meshing with an internal gear $k$ in the shell K. A ring T secured by the screws to the body R retains the pinion O and gear P in their places. A lever S is used to hold the body R from turning.

The tap holder is fastened in the spindle of the drill press, lathe or other suitable machine, by means of the shank I. The clutch member N ($N^1$) being in contact with the member M, carried by the flange of the shank, this clutch member M and the chuck are revolved right-handed, while the gears O, P run idly. The spindle of the drill press is lowered or moved to carry the tap into the work until its stop is reached. Then the spindle of the drill press is moved back and the spindle I, shell K, and body R are drawn back, thereby throwing the clutch member N ($N^1$) into contact with driven gear P, whereupon owing to the continued rotating of the spindle and shell, a reverse motion will be imparted through the gear to the clutch piece N ($N^1$) and hence to the chuck and tap to withdraw the latter from the work, and owing to the relative sizes of the gears $k$, O, P, the tap will be withdrawn or backed out of the work very quickly, say twice as fast as in the forward or tapping motion.

I claim as my invention

1. A tap holder containing a clutch and reversing gear and having a rotating shell and shank, with a body part within the shell independent of the clutch, and on which the shell revolves, spring-pressed pins in the body part to bear against the movable part of the clutch and normally hold the latter to the shell, and a lever for holding the said body part.

2. A tap holder containing a clutch and reversing gear and having a rotating shell and shank, with a body part within the shell independent of the clutch and on which the shell revolves, a ring at the mouth of the shell to retain the body part, spring-pressed pins in the body part to bear against the movable part of the clutch to normally hold the latter to the shell, and means to hold said body part from rotation.

In testimony whereof I have signed my name to this specification, in the presence of two subscribing witnesses.

WILBUR A. LEONARD.

Witnesses:
   C. C. CHATFIELD,
   EDITH M. BUCKBEE.